US011804784B2

(12) United States Patent
Fauni et al.

(10) Patent No.: US 11,804,784 B2
(45) Date of Patent: Oct. 31, 2023

(54) APPARATUS AND METHOD FOR SYNCHRONOUS RECTIFIER CONTROL DELAY

(71) Applicant: AES Global Holdings PTE Ltd., Singapore (SG)

(72) Inventors: Jonathan Ross Bernardo Fauni, Quezon (PH); Jessica Magsino, Pasig (PH)

(73) Assignee: AES Global Holdings PTE Ltd., Singapore (SG)

( * ) Notice: Subject to any disclaimer, the term of this patent is extended or adjusted under 35 U.S.C. 154(b) by 0 days.

(21) Appl. No.: 18/165,487

(22) Filed: Feb. 7, 2023

(65) Prior Publication Data

US 2023/0188049 A1 Jun. 15, 2023

Related U.S. Application Data (63) Continuation of application No. 17/171,810, filed on Feb. 9, 2021, now Pat. No. 11,575,327.

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 1/0058* (2021.05)

(58) Field of Classification Search
CPC ... H02M 3/33592; H02M 1/08; H02M 1/0058
See application file for complete search history.

(56) References Cited

U.S. PATENT DOCUMENTS

| 9,887,633 | B2 | 2/2018 | Choi |
| 11,575,327 | B2* | 2/2023 | Fauni ...................... H02M 1/08 |
| 2012/0033453 | A1 | 2/2012 | Gong |
| 2015/0019055 | A1 | 1/2015 | Nie et al. |
| 2015/0229225 | A1 | 8/2015 | Jang et al. |
| 2019/0028036 | A1 | 1/2019 | Okazaki et al. |
| 2020/0052498 | A1 | 2/2020 | Liu et al. |
| 2021/0159804 | A1 | 5/2021 | Yamada |

FOREIGN PATENT DOCUMENTS

CN 105896992 A 8/2016

OTHER PUBLICATIONS

International Search Report and Written Opinion for PCT Application No. PCT/SG2022/050064, filed Feb. 8, 2022; dated Jul. 19, 2022; 8 pages.

* cited by examiner

*Primary Examiner* — Kyle J Moody (57) ABSTRACT

A circuit for use in an LLC converter comprises a first primary side switch, a first secondary side switch assembly, and a controller. The controller is configured to measure, on the primary side of the LLC converter, a first voltage and determine, based on the first voltage, a delay due to the first voltage. The controller is also configured to apply a first gate voltage to the first primary side switch to transition the first primary side switch from an off state to an on state and apply a second gate voltage to the first secondary side switch assembly to transition the first secondary side switch assembly from an off state to an on state. The application of the first gate voltage and the application of the second gate voltage are separated by a synchronous rectifier delay based at least on the delay due to the first voltage.

20 Claims, 7 Drawing Sheets

APPARATUS AND METHOD FOR SYNCHRONOUS RECTIFIER CONTROL DELAY

CROSS-REFERENCE TO RELATED APPLICATIONS

This application claims the benefit and priority of U.S. application Ser. No. 17/171,810, filed Feb. 9, 2021. The entire disclosure of the above application is incorporated herein by reference.

TECHNICAL FIELD

Aspects of the disclosure are related to power supplies and, in particular, to rectifier conduction delay.

BACKGROUND

A power supply typically converts an incoming voltage into a different, output voltage. For example, an alternating current (AC) input voltage may be converted to a direct current (DC) voltage for use by electronic equipment. In another example, a first DC input voltage may be converted to a different DC voltage for use by the electronic equipment.

An LLC synchronous rectifier converter or LLC resonant converter (LLC converter) can include primary side switches and secondary side switches. Typically, one or more switches of the primary side switches are controlled in correlation with one or more switches of the secondary side switches. The other primary side switches are also controlled in correlation with the other secondary side switches. In one example, the corresponding switches are controlled to turn on and off together. In a half-bridge LLC converter having two primary switches (PS1 and PS2) and four secondary switches (SS1, SS2, SS3, and SS4), the primary switch PS1 may be turned on and off together with related secondary side switches S1, S3. Further, the primary switch PS2 may be turned on and off together with related secondary side switches SS2, SS4.

However, the secondary side conduction does not always coincide with that of the primary side conduction in all operating modes of the LLC converter. For example, during a constant current mode (CC mode), the LLC converter can operate in a heavy continuous conduction mode (CCM-heavy). During the CC mode, the converter operates to maintain a fixed CC level regardless of different load impedances and output voltages. When operating in the CCM-heavy mode, a shoot-through or shorted condition of the secondary side switches can occur if the secondary side switches are turned on at the same time with their corresponding primary side switches, which can affect converter performance, life, and efficiency.

OVERVIEW

In accordance with one aspect, a circuit for use in an LLC converter with an LLC primary side and an LLC secondary side, the circuit comprises a first primary side switch, a first secondary side switch assembly, and a controller. The controller is configured to measure, on the primary side of the LLC converter, a first voltage and determine, based on the first voltage, a delay due to the first voltage. The controller is also configured to apply a first gate voltage to the first primary side switch to transition the first primary side switch from an off state to an on state and apply a second gate voltage to the first secondary side switch assembly to transition the first secondary side switch assembly from an off state to an on state. The application of the first gate voltage and the application of the second gate voltage are separated by a synchronous rectifier delay based at least on the delay due to the first voltage.

In accordance with another aspect, a method for adjusting off-to-on time delay between primary and secondary side switches in an LLC converter, the method comprises monitoring, on a primary side of the LLC converter, an input voltage and determining, based on the input voltage, a synchronous rectifier delay. The method also comprises causing a first primary side switch to transition from an off state to an on state, delaying a first period of time based on the synchronous rectifier delay, and causing a first secondary side switch assembly to transition from an off state to an on state after the first period of time.

BRIEF DESCRIPTION OF THE DRAWINGS

The drawings illustrate embodiments presently contemplated for carrying out embodiments of the present disclosure.

In the drawings.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
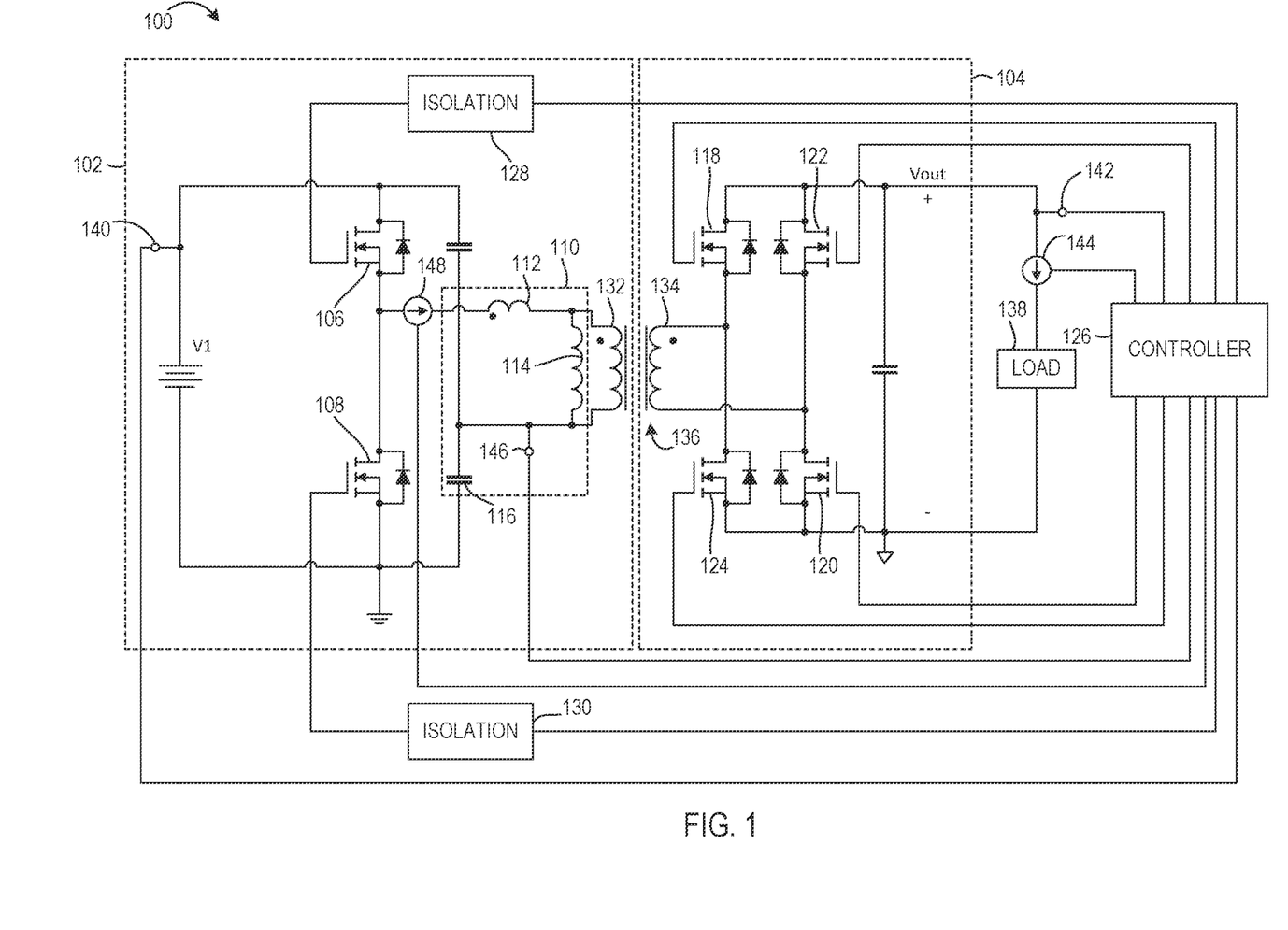
FIG. 1 illustrates an LLC converter circuit according to an embodiment of the present disclosure.

FIG. 1 illustrates an LLC converter 100 circuit according to an embodiment of the present disclosure. LLC converter 100 has a primary side 102 and a secondary side 104. The primary side 102 is illustrated as a half bridge configuration in FIG. 1 including two switches 106, 108 and a resonant network 110 including a resonant inductor 112, a shunt inductor 114, and a resonant capacitor 116.

The LLC converter 100 depicted in FIG. 1 utilizes synchronous rectification and, accordingly, includes switches or transistors 118, 120, 122, 124 in the secondary side 104. Transistors 118, 122 alternately operate as a high side switches for the secondary side 104, and transistors 120, 124 alternately operate as a low side switches for the secondary side 104. A controller 126 includes the hardware and logic used to drive switches 106, 108, 118, 120, 122, 124 and implement an algorithm to improve performance and efficiency by manipulating the turn-on times of the secondary side switches 118, 120, 122, 124 in relation to their corresponding first side switches 106, 108. One or more isolation components 128, 130 (e.g., an optocoupler) may be used to communicate gate turn-on signals to the first side switches 106, 108 as illustrated and/or to the secondary side switches 118, 120, 122, 124 to provide isolation between the primary side 102 and the secondary side 104.

According to another embodiment, an LC series resonant converter may be formed from the components of the LLC converter 100 of FIG. 1 by removing the inductor 114. This disclosure contemplates control of the primary and secondary side switches for the LLC converter 100 and the LC series resonant converter in the same or similar control schemes.

In one mode of operation, the controller 126 operates the high-side primary switch 106 in cooperation with the correlating secondary side switches 118, 120 corresponding to a first portion of an operation mode such as a constant current mode (CC mode). During a second portion of the operation mode, the controller 126 operates the low-side primary switch 108 in cooperation with the correlating secondary side switches 122, 124. Operation of the primary side switches 106, 108 in an alternating manner produces a sinusoidal current that is transmitted from the primary side 102 to the secondary side 104 via the primary and secondary windings 132, 134 of a transformer 136. The alternating current is rectified by appropriate operation of the secondary side switches 118, 120, 122, 124 to produce an output voltage, $V_{out}$, supplied to a load 138.

A number of measurement sensors are illustrated for use in determining synchronous rectifier delay times according to embodiments. A first sensor includes an input voltage sensor 140 configured to measure the input voltage, $V_{in}$, of the LLC converter 100. A second sensor includes an output voltage sensor 142 configured to measure the output voltage, $V_{out}$, of the LLC converter 100. A load or output current sensor 144 is configured to measure the current being supplied to the load 138. The controller 126 is configured to measure the input and output voltages and the output current as described herein as part of the control scheme for controlling the LLC converter 100. Additional sensors include a resonant capacitor voltage sensor 146 and a primary current sensor 148.

Figure 2:
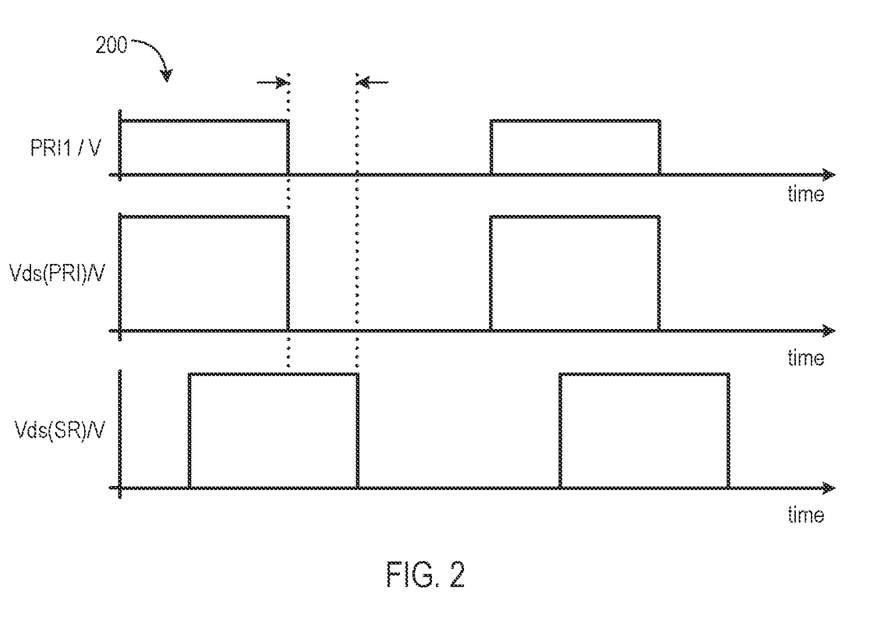
FIG. 2 illustrates example waveforms corresponding to voltage waveforms of primary and secondary side switches according to an embodiment.

FIG. 2 illustrates example waveforms corresponding to operation of the high-side switch 106 (PRI1) and voltage waveforms corresponding to the voltage between the drain and source of the high-side switch 106 (Vds(PRI)) and to the voltage between the drain and source of the secondary side switch 118 (Vds(SR)). FIG. 2 illustrates an example of a CC mode operation during a CCM-heavy condition. As illustrated, when the gate command signal 200 of the switch 106 transitions from low to high or from high to low, the Vds(PRI) voltage of the switch 106 also correspondingly transitions from low to high or high to low in a substantially short time response. However, the Vds(SR) transitions from low to high and from high to low of the secondary side switch 118 is shifted in phase from the shifts in the Vds(PRI) voltage. Such phase shift is presented as a delay of the current in the secondary side of the LLC converter 100. It has been observed that the further the operation of the resonant network 110 is into the CCM-heavy condition, the larger the phase shift delay exhibited in the circuit.

Figure 3:
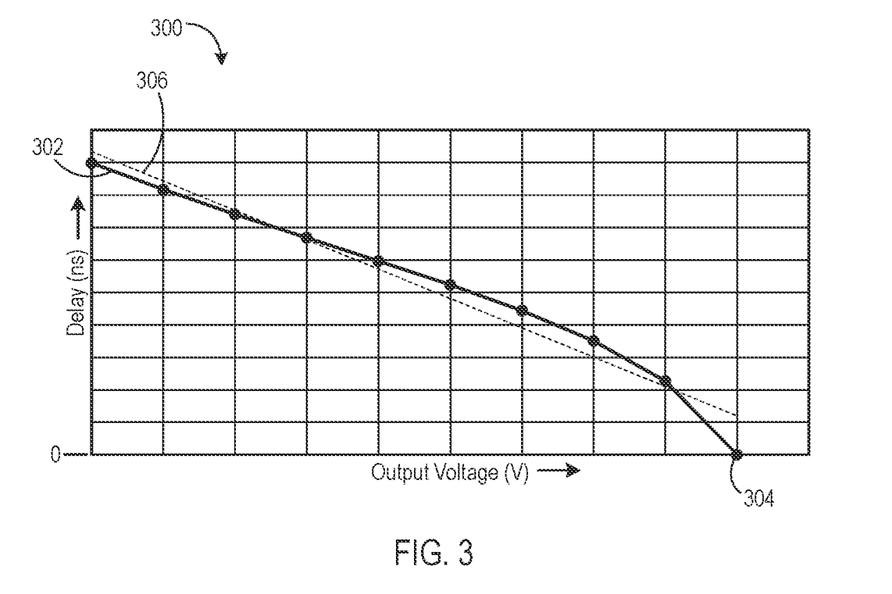
FIG. 3 illustrates a plot of output voltage versus delay of conduction delay (phase shift) experienced at different output voltages according to an embodiment.

FIG. 3 illustrates a plot 300 of output voltage versus delay of the conduction delay (phase shift) experienced at different output voltages ($V_{out}$). As shown, a curve 302 illustrates the delays increasing as the output voltage decreases. At or above a certain nominal voltage 304, the delay disappears or becomes negligible. Accordingly, for voltages above the nominal voltage, operation of the LLC converter 100 without consideration for the phase shift delay between current conduction in the primary side 102 and current conduction in the secondary side 104 may be performed. A linear trend line 306 based on the delay values at the various corresponding voltage values can be used to calculate the portion of the overall phase shift to be introduced into the control scheme controlling the LLC converter 100 as described below with respect to FIGS. 6, 7. Other trend lines of higher polynomial bases or other shapes may be generated in addition to or instead of the linear trend line shown in FIG. 3. While plot 300 illustrates conduction delay versus output voltage, additional plots of conduction delay due to other factors such as input voltage ($V_{in}$), load or output current ($I_{out}$), and the like may be determined.

Figure 4:
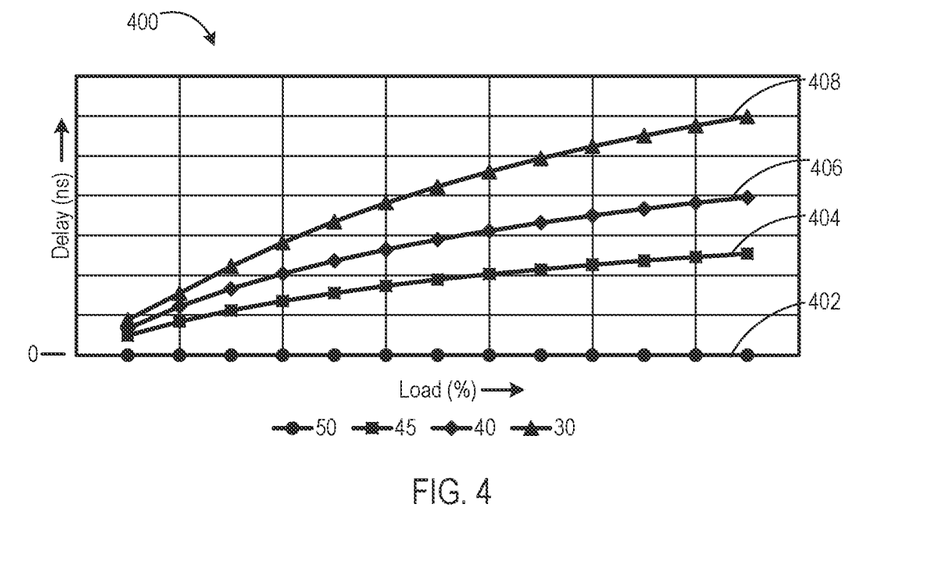
FIG. 4 illustrates a plot showing trends in phase shift delay with different output trim conditions according to an embodiment.

FIG. 4 illustrates a plot 400 showing trends in the phase shift delay with different output trim conditions. For example, for a given voltage, variances in the load exhibit different delays. As described above with respect to FIG. 3, phase shift delays at or above a nominal voltage exhibits little to no delay. As shown, a curve 402 corresponding to 50 V, for example, illustrates no delay across the calculated load percentages. However, delays shown in curves 404, 406, 408 for corresponding voltages 45 V, 40 V, and 35 V, for example, illustrate increasing trends in the delay as the load percentage increases.

Figure 5:
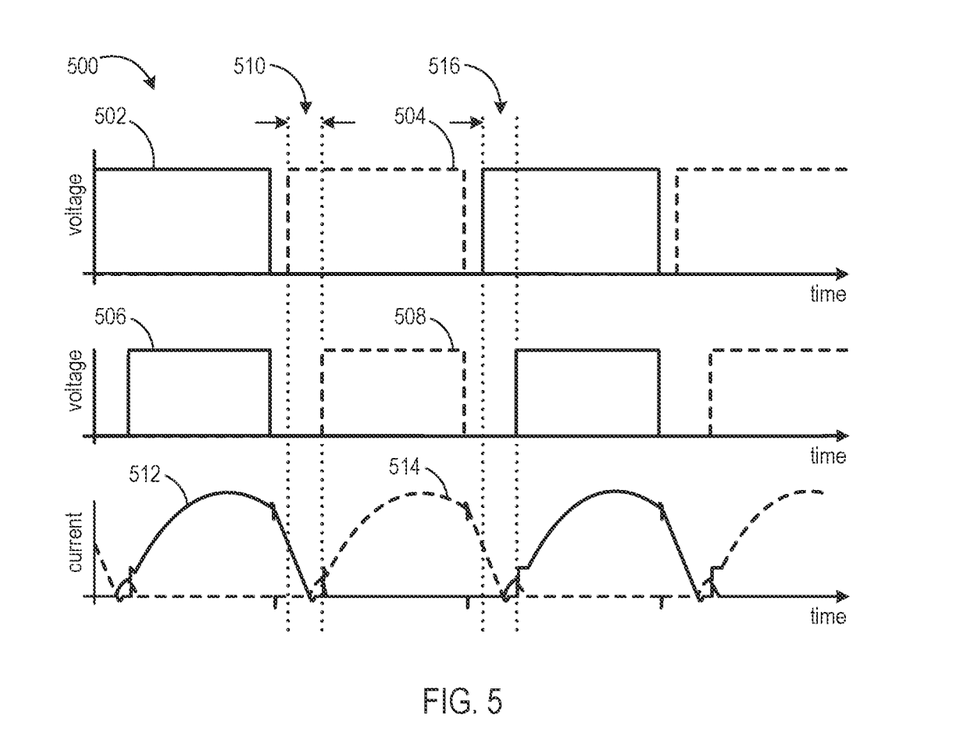
FIG. 5 illustrates waveforms of a control scheme according to an embodiment.

FIG. 5 illustrates waveforms of a control scheme 500 according to an embodiment. Control scheme 500 includes gate control waveforms 502, 504, respectively for the primary side switches 106, 108. As illustrated, the waveforms 502, 504 may control the amount of turn-off time and turn-on time of each to substantially the same. Alternatively, depending on other desired conditions of the output voltage $V_{out}$, the turn-on time and/or the turn-off time of each switch 106, 108 may be different, thus yielding distinct duty cycles.

Control scheme 500 also illustrates a gate control waveform 506 for secondary side switches 118, 120 correlated with primary side switch 106 and illustrates a gate control waveform 508 for secondary side switches 122, 124 correlated with primary side switch 108. As shown, a delay 510 exists between the turn-on time of the primary side switch 108 (controlled by the gate control waveform 504) and the turn-on time of the secondary side switches 122, 124 (controlled by the gate control waveform 508). A current waveform 512 illustrates current flow through the secondary side switches 118, 120, and a current waveform 514 illustrates current flow through the secondary side switches 122, 124. While the gate control waveform 508 illustrates an off-to-on transition that overlaps current conduction in the secondary side switches 118, 120 (e.g., prior to current cessation as shown in an overlap at the beginning of the delay 510 with the current waveform 512), the off-to-on transition of the secondary side switches 122, 124 as controlled by the current waveform 514 is delayed at least by the delay 510 to avoid simultaneous current conduction in the secondary side switches 118, 120. In this manner, the closing of the secondary side switches 122, 124 after cessation of current conduction avoids an overlap with current conduction in the secondary side 104. As further illustrated, the off-to-on transition of the secondary side switches 118, 120 as controlled by the current waveform 512 is delayed at least by a delay 516 to avoid an overlap with the simultaneous current conduction in the secondary side switches 122, 124. The delays 510 and 516 may be substantially similar or may be different due to one or more changes in the operation of the resonant network 110, which can cause the respective delay (510 or 516) to yield a new value based on operating parameters.

Figure 6:
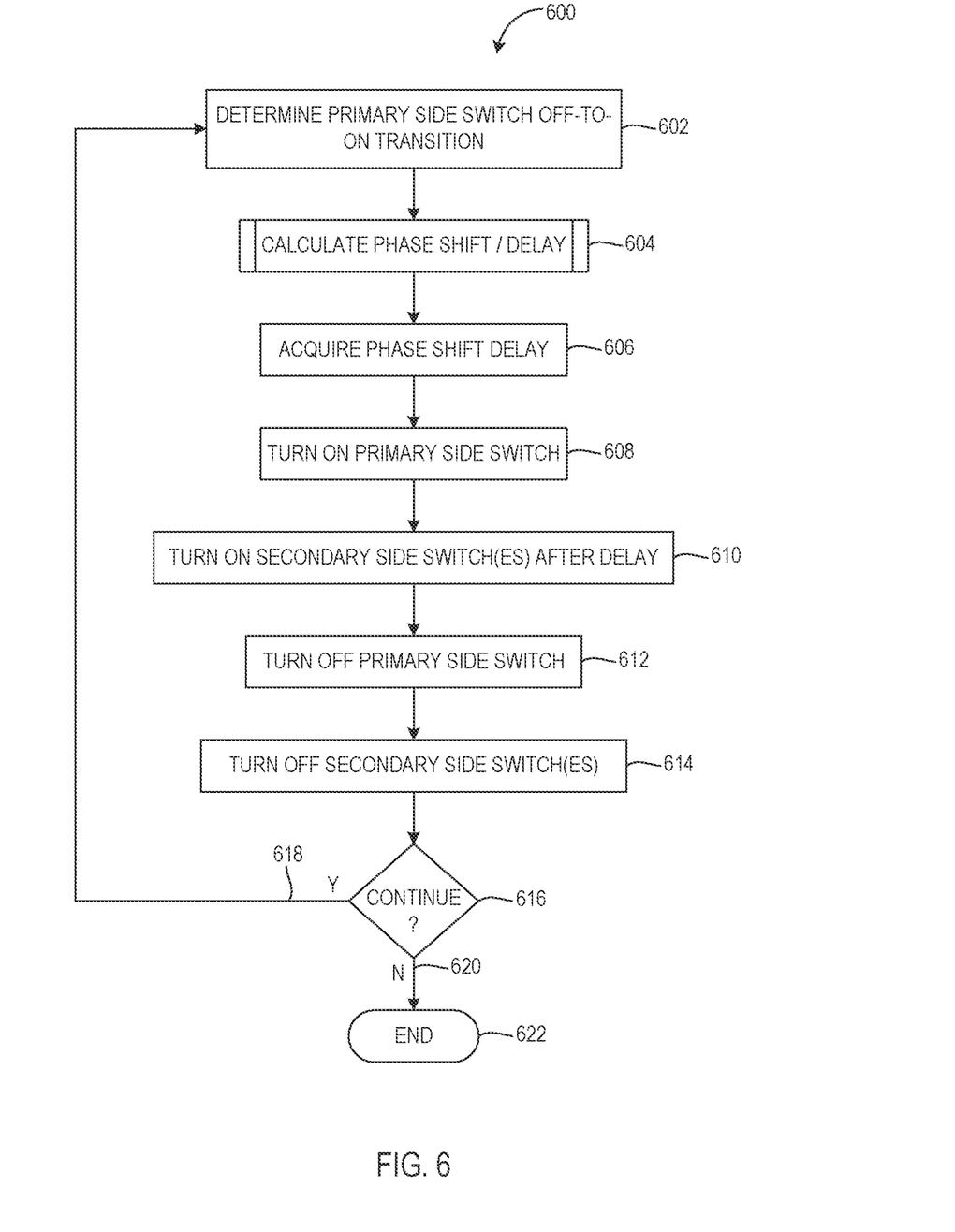
FIG. 6 illustrates a flowchart showing a procedure for implementing the control scheme of FIG. 5 according to an embodiment.

FIG. 6 illustrates a flowchart showing a control procedure 600 for implementing the control scheme of FIG. 5 according to an embodiment. The calculation procedure 600 may be implemented by the controller 126 of FIG. 1 or by another controller or digital processor in the LLC converter 100. Control procedure 600 begins at step 602 with determining the off-to-on time of a first primary side switch such as the switch 106 of FIG. 1. The off-to-on time may be determined by evaluating parameters of a PWM control signal for the first primary side switch and/or a second primary side switch in one embodiment. In one example, the parameters of the PWM control signal may indicate a desired duty cycle for the control signal of each primary switch such as a 45% duty cycle where the on time for each switch is during the off time of the other switch.

At step 604, a calculation procedure calculates a phase shift or delay that separates the off-to-on time of the first primary side switch and the off-to-on time of the secondary side or synchronous rectifier switches (e.g., switches 118, 120) corresponding to the first primary side switch. This delay is illustrated as delay 510 in FIG. 5.

Figure 7:
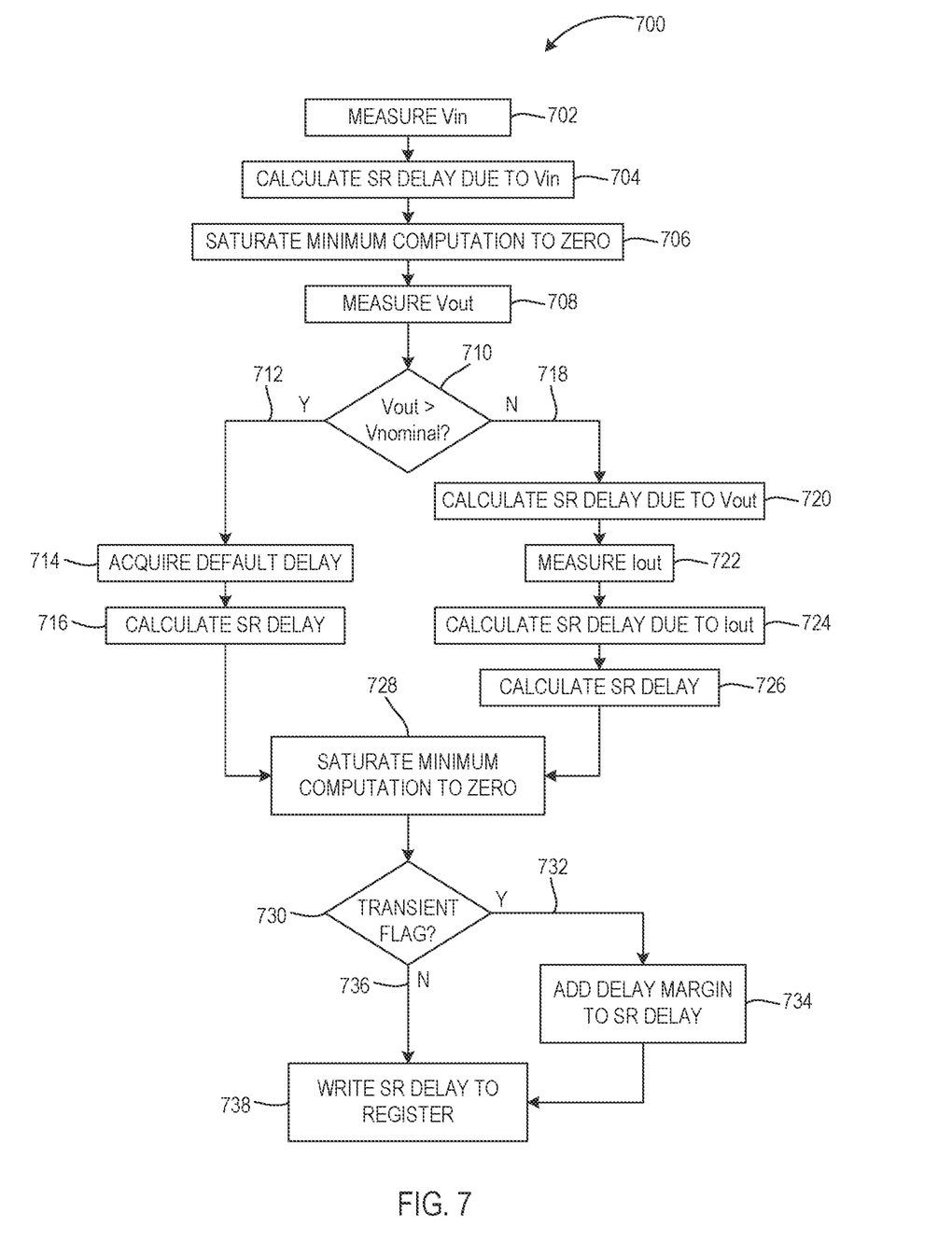
FIG. 7 illustrates a calculation procedure for calculating a phase shift according to an embodiment.

Referring to FIG. 7, a calculation procedure 700 is shown for calculating the phase shift according to an embodiment. The calculation procedure 700 may be implemented by the controller 126 of FIG. 1 or by another controller or digital processor in the LLC converter 100. Calculation procedure 700 begins at step 702 with measuring the input voltage yin using, for example, the input voltage sensor 140 of FIG. 1. At step 704, the portion of the synchronous rectifier delay (SR delay) due to the input voltage $V_{in}$ is calculated. The SR delay due to $V_{in}$ may be based on a trend calculation determined from plotting and/or calculating delays at various input voltage values similar to the plot 300 illustrated in FIG. 3 for $V_{out}$. The trend calculation may generate a polynomial equation, for example, of the trend of the SR delay due to $V_{in}$ as follows:

$$SR_{vi}=V_{in}*A1_{vi}+C_1 \quad \text{(Eqn. 1)}$$

where $V_{in}$ is the input voltage measured at step 702, $A1_{vi}$ is the slope of the linear calculation, and $C_1$ is the y intercept of the linear calculation. As used herein, polynomial equations are expressed in the form of $a_n(x^n)$, where a is the coefficient, x is the variable, and n is the exponent. In Eqn. 1, $V_{in}$ corresponds to the $a_1$ coefficient, $A1_{vi}$ corresponds to the $x^1$ variable, and $C_1$ corresponds to the $a_0$ coefficient. The use of n=1 (i.e., a monomial equation) to form a linear trend line may be based on a trade-off between accuracy of the trend line to match the plotted values and the calculation speed of the controller performing the SR delay calculations. Higher-order polynomial trend lines (e.g., n>1) can provide higher accuracy but can also involve a lengthier computational time and/or complexity. However, with appropriate selection of the controller used to perform the SR delay calculations within a desired time, desired operational parameters of the LLC converter 100 can be met. The SR delay due to $V_{in}$ is then calculated using measured $V_{in}$ in Eqn. 1.

At step 706, the effective SR delay due to $V_{in}$ is saturated to zero to eliminate any calculated values less than zero. In this step, any negative calculation values are replaces with a value of zero, which indicates that, for the measured $V_{in}$ in step 702, there is no SR delay contribution due to $V_{in}$.

At step 708, the output voltage $V_{out}$ is measured using, for example, the output voltage sensor 142 of FIG. 1. The measured $V_{out}$ is compared with a nominal voltage, $V_{nominal}$, at step 710. The nominal voltage is a voltage such as nominal voltage 304 of FIG. 3, where SR delays due to output voltages at or above the nominal voltage are negligible and can be ignored. Accordingly, if $V_{out}$ is greater than or equal to the $V_{nominal}$ (712), then a default delay due to, for example, a minimum dead time, is acquired at step 714. The default delay adds a margin of SR delay to ensure that turning on the first set of SR switches (e.g., switches 118, 120) is avoided during conduction in the second set of SR switches (e.g., switches 122, 124). At step 716, the effective SR delay, $SR_{delay}$, is calculated as the sum of the default delay and the effective SR delay due to $V_{in}$.

If $V_{out}$ is less than the $V_{nominal}$ (718), portions of the SR delay due to $V_{out}$ and $I_{out}$ are calculated. The portion of the SR delay due to $V_{out}$ is calculated at step 720. Like the portion of the SR delay due to $V_{in}$ above, the portion of the SR delay due to $V_{out}$ can be calculated based on a linear trend line using the polynomial equation:

$$SR_{vo}=V_{out}*A2_{vo}+C_2 \quad \text{(Eqn. 2)}$$

where $V_{out}$ is the output voltage measured at step 708, $A2_{vo}$ is the slope of the linear calculation, and $C_2$ is the y intercept of the linear calculation. $I_{out}$ is measured at step 722. The portion of the SR delay due to $I_{out}$ is calculated at step 724 based on a linear trend line using the polynomial equation:

$$SR_{io}=I_{out}*A3_{io}+C_3 \quad \text{(Eqn. 3)}$$

where $I_{out}$ is the output current measured at step 724, $A3_{io}$ is the slope of the linear calculation, and $C_3$ is the y intercept of the linear calculation. At step 726, the SR delay is calculated according to the following equation:

$$SR_{delay}=SR_{vi}+SR_{vo}-SR_{io} \quad \text{(Eqn. 4)}$$

The SR$_{delay}$, whether calculated via path 712 or path 718, is saturated at step 728 to ensure that negative values are set to zero and that any value above a maximum computed threshold is reduced to the maximum threshold. The SR$_{delay}$ values within the zero to maximum threshold range are not adjusted due to saturation at step 728.

At step 730, the calculation procedure 700 checks whether a transient flag has been triggered. The transient flag may get triggered based on a change in frequency of the compensator output above a frequency threshold and/or based on a change in the slew rate of the output current above a current threshold. If the transient flag is set (732), the SR$_{delay}$ is adjusted with a delay margin being added thereto at step 734 to ensure that turning on the first set of SR switches (e.g., switches 118, 120) occurs after conduction in the second set of SR switches (e.g., switches 122, 124). In this manner, a change above the respective threshold can account for additional delay(s) due to the rate of change. If the transient flag is not set (736), no additional delay margin due to a transient condition needs to be added to the SR$_{delay}$. At step 738, the SR$_{delay}$ is saved and written to a delay register for use by the control procedure 600.

Referring again to FIG. 6, after calculation of the phase shift or SR delay, SR$_{delay}$, at step 604, the control procedure 600 acquires (at step 606) the SR$_{delay}$ from the delay register written at step 738 of the calculation procedure 700. The primary side switch (e.g., switch 106 or switch 108) is tuned on at step 608, and after a delay specified by the SR$_{delay}$, the corresponding synchronous rectifier switches (e.g., switches 118, 120 or switches 122, 124) are turned on at step 610.

At step 612, the primary side switch is turned off as appropriate for the duty cycle desired for the switch. The corresponding synchronous rectifier switches are also turned off at step 614. In one embodiment, the synchronous rectifier switches are turned off shortly after or substantially synchronously with the primary side switch. In other embodiments, a further delay may be present between turning off the primary side switch and turning off the secondary side switches.

Figure 8:
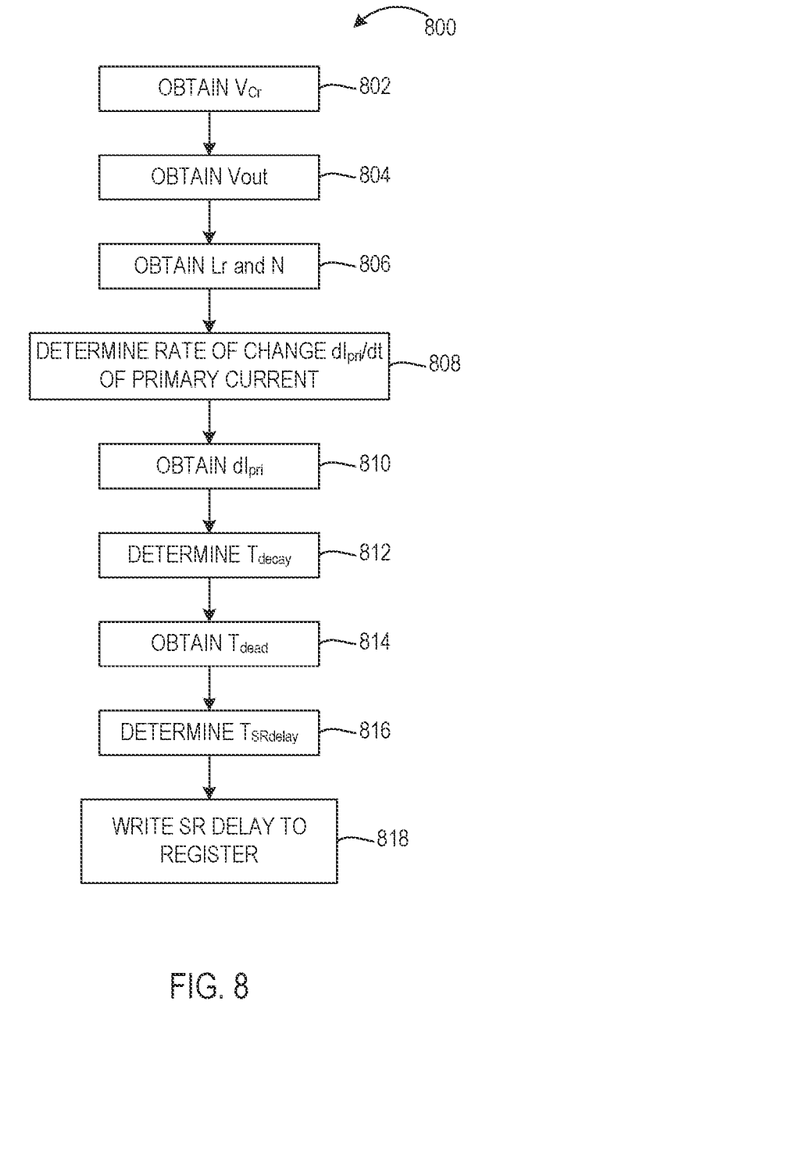
FIG. 8 illustrates a calculation procedure for calculating a phase shift according to another embodiment.

The control procedure 600 determines whether the procedure should continue at decision 616. If so (618), procedural control returns to step 602 for controlling the alternate primary side switch. In this subsequent iteration of the calculation procedure 800, updated measurement values acquired from the LLC circuit during calculation of the phase shift at step 604 may produce the same or a different value for the delay. Otherwise (620), the control procedure 600 terminates at step 622.

FIG. 8 illustrates a calculation procedure 800 for calculating the phase shift according to another embodiment. The calculation procedure 800 may be implemented by the controller 126 of FIG. 1 or by another controller or digital processor in the LLC converter 100. In this embodiment, calculating the delay includes determining the rate of change of the decay of the primary current, I$_{pri}$, by the equation:

$$\frac{dI_{pri}}{dt} = -\frac{V_{Cr} + N \cdot V_{out}}{L_r} \quad \text{(Eqn. 5)}$$

where V$_{Cr}$ is the resonant capacitor voltage of the resonant network (e.g., capacitor 116 of FIG. 1), N is the turns ratio (N$_{primary}$/N$_{secondary}$) of the transformer (e.g., transformer 136 of FIG. 1), V$_{out}$ is the measured output voltage, and L$_r$ is the resonant inductance of the resonant network inductor (e.g., inductor 112 of FIG. 1). The resonant capacitor voltage, V$_{Cr}$, may be measured by resonant capacitor voltage sensor 146 of FIG. 1 in an example. Further, the output voltage V$_{out}$ may be measured using, for example, the output voltage sensor 142 of FIG. 1. The turns ratio, N, and the resonant inductance, L$_r$, are known parameters based on the components used in the circuit of the LLC converter 100.

The calculation procedure 800 begins with determining the four parameters of Eqn. 5. At step 802, the resonant capacitor voltage, V$_{Cr}$, is obtained, and the output voltage, V$_{out}$, is obtained at step 804. The voltages may be measured using, for example, resonant capacitor voltage sensor 146 and output voltage sensor 142 of FIG. 1. In other embodiments, either or both of the V$_{Cr}$ and the V$_{out}$ may be computed or estimated. When measured, the V$_{Cr}$ measurement is taken at or very near to the turn-off time of the primary switch(es). The measurement for V$_{out}$ may also be taken at this time. At step 806, the resonant inductance of the resonant network inductor and the turns ratio, N, of the transformer are obtained, for example, from a memory storage location. The rate of change, dI$_{pri}$/dt, of the decay of the primary current is determined at step 808 based on Eqn. 5.

Figure 9:
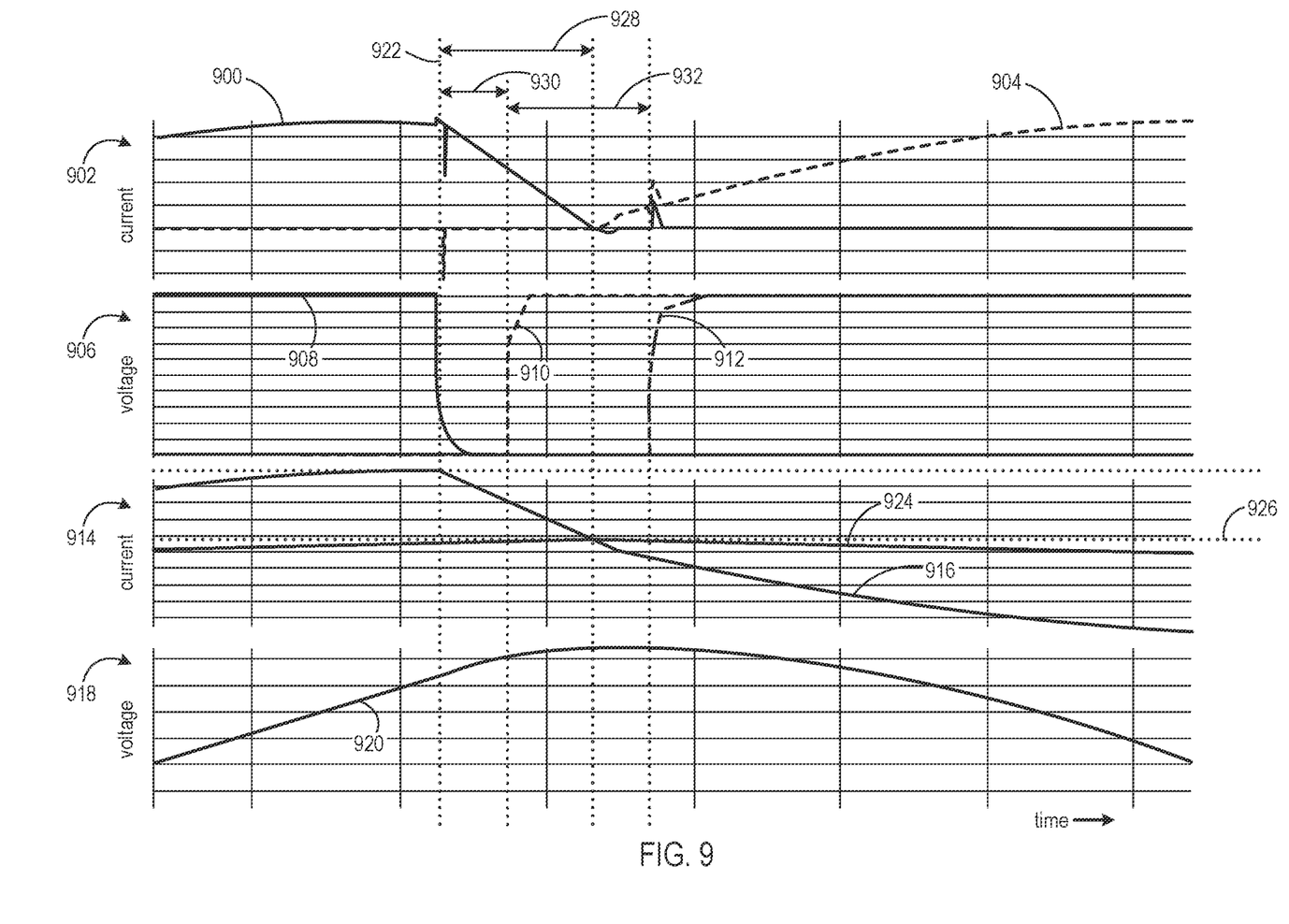
FIG. 9 illustrates exemplary operational waveforms according to an embodiment.

Referring to FIG. 9, various curves are illustrated in an operating example. A current curve 900 of current flowing through a first set of synchronous rectifier switches (e.g., switches 118, 120) is shown on a plot 902 together with a current curve 904 of current flowing through a second set of synchronous rectifier switches (e.g., switches 122, 124). Another plot 906 illustrates a voltage curve 908 of a gate voltage of a first primary side switch (e.g., switch 106), a voltage curve 910 of a gate voltage of a second primary side switch (e.g., switch 108), and a voltage curve 912 of a gate voltage of a switch of the second set of synchronous rectifier switches. A third plot 914 illustrates a current curve 916 of current flowing in the primary side such as through the inductor 112 of FIG. 1, for example. A fourth plot 918 illustrates a voltage curve 920 of a resonant capacitor voltage (e.g., capacitor 116 of FIG. 1).

At a turn off time 922 of the first primary side switch (e.g., switch 106), energy in the resonant inductor (e.g., inductor 112) continues to cause current to flow through the primary side as shown in current curve 916. During this continued primary current flow, since the primary current is still decaying, a turn on of the second primary side switch (e.g., switch 108) in this interval yields no conduction from the other rectifier set in the secondary side until the current flowing through the primary side has decayed to a magnetizing current level, illustrated as current curve 924. The magnetizing current level is represented as trend line 926 in FIG. 9. The discharge or decay of the primary side current introduces a delay, T$_{decay}$, 928 in the conduction of the secondary rectifiers. Furthermore, T$_{decay}$ 928 includes a dead time, T$_{dead}$, 930 component between the turn off of the first primary side switch and the turn on of the second primary side switch. The SR delay, T$_{SRdelay}$, 932 may be determined based on the delay 928 and the dead time 930 based on the following equation:

$$T_{SRdelay} = T_{decay} - T_{dead} + T_{margin} \quad \text{(Eqn. 6)}$$

where T$_{margin}$ corresponds to an additional time buffer. T$_{margin}$ can help to ensure that turning on the second set of synchronous rectifiers occurs after current conduction through the first set of synchronous rectifiers.

Referring to FIGS. 8 and 9, the value for T$_{decay}$ 928 may be determined from Eqn. 5 for the value of dt. That is, dI$_{pri}$ may be divided by the value determined for the rate of change, dI$_{pri}$/dt, at step 808. Accordingly, the calculation procedure 800 includes determining the change in the primary current, $dI_{pri}$, at step 810 by measuring the current through the resonant inductor at or near the turn off time 922 and by measuring the current through the resonant inductor when the current through the first set of synchronous rectifier switches substantially disappears. At that point, current flowing through the primary side has sufficiently decayed to the magnetizing current level. With the value for the change in the primary current, $dI_{pri}$, known from step 810 as well as the value for the rate of change, $dI_{pri}/dt$, of the decay of the primary current from step 808, The value for $T_{decay}$ 928 may be determined at step 812 by dividing $dI_{pri}$ by $dI_{pri}/dt$.

At step 814, the dead time $T_{dead}$ 930 may be obtained from the control scheme for driving the gate voltages of the primary side switches. The control scheme can be examined to determine the time specified for turning off the first primary side switch and the time specified for turning on the next primary side switch. The time between turning off the first switch and turning on the other switch corresponds to the dead time 930. Next, at step 816, the SR delay, $T_{SRdelay}$ 932 may be determined by subtracting the dead time 930 from the value for $T_{decay}$ 928 and, according to an embodiment, adding an extra time buffer, $T_{margin}$. As with the calculation procedure 700 of FIG. 7, the calculation procedure 800 of FIG. 8 includes saving and writing the calculated SR delay, $T_{SRdelay}$, to a delay register at step 818 for use by the control procedure 600.

Embodiments of the disclosure operate to determine the SR delay between turning on a primary side switch and turning on corresponding secondary side switches to take into account a trend for a lighter load or a higher output voltage to benefit from a shorter delay while heavier loads and lower output voltages benefit from longer delays.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A circuit for use in an LLC converter with an LLC primary side and an LLC secondary side, the circuit comprising:
   a first primary side switch;
   a first secondary side switch assembly;
   a controller configured to:
      measure, on the LLC secondary side, a first voltage comprising an output voltage of the LLC converter;
      determine, based on the first voltage, a synchronous rectifier delay due to the first voltage;
      adjust the synchronous rectifier delay by a delay margin based on a slew rate of an output current on the LLC secondary side above a current threshold;
      apply a first gate voltage to the first primary side switch to transition the first primary side switch from an off state to an on state; and
      apply a second gate voltage to the first secondary side switch assembly to transition the first secondary side switch assembly from an off state to an on state;
      wherein the application of the first gate voltage and the application of the second gate voltage are separated by the adjusted synchronous rectifier delay.

2. The circuit of claim 1, wherein the controller, in being configured to determine the synchronous rectifier delay, is configured to apply the first voltage in a linear polynomial equation, the linear polynomial equation based on a linear trend of expected delay values at corresponding first voltage values.

3. The circuit of claim 1, wherein the controller is further configured to add a default delay to the synchronous rectifier delay prior to applying the second gate voltage.

4. The circuit of claim 1, wherein the controller is further configured to:
   measure, on the LLC primary side, an input voltage;
   determine, based on the input voltage, a delay due to the input voltage; and
   calculate the synchronous rectifier delay further based on the delay due to the input voltage.

5. The circuit of claim 4, wherein the controller is further configured to compare the output voltage to a nominal voltage; and
   wherein the controller, in being configured to calculate the synchronous rectifier delay, is configured to calculate the synchronous rectifier delay if the output voltage is less than the nominal voltage.

6. The circuit of claim 4, wherein the controller is further configured to:
   set the synchronous rectifier delay to zero if the calculated synchronous rectifier delay is less than zero; and
   set the synchronous rectifier delay to a maximum value if the synchronous rectifier delay is above the maximum value.

7. The circuit of claim 1, wherein the controller is further configured to adjust the synchronous rectifier delay by a frequency output above a frequency threshold.

8. The circuit of claim 1, wherein the first secondary side switch assembly comprises:
   a high side switch coupled to a secondary winding of a transformer; and
   a low side switch coupled to the secondary winding of the transformer.

9. The circuit of claim 8 further comprising:
   a second primary side switch forming a half bridge configuration with the first primary side switch; and
   a second secondary side switch assembly comprising:
      a high side switch coupled to the secondary winding; and
      a low side switch coupled to the secondary winding.

10. The circuit of claim 9, wherein the controller is further configured to:
    apply a third gate voltage to the first primary side switch to transition the first primary side switch from the on state to the off state;
    apply a fourth gate voltage to the first secondary side switch assembly to transition the first secondary side switch assembly from the on state to the off state;
    apply a fifth gate voltage to the second primary side switch to transition the second primary side switch from an off state to the on state; and
    apply a sixth gate voltage to the second secondary side switch assembly to transition the second secondary side switch assembly from an off state to the on state;
    wherein application of the sixth gate voltage occurs after current conduction through the first secondary side switch assembly.

11. A method for adjusting off-to-on time delay between primary and secondary side switches in an LLC converter, the method comprising:
- monitoring, on a secondary side of the LLC converter, an output voltage of the LLC converter;
- determining, based on the output voltage, a synchronous rectifier delay;
- adjusting the synchronous rectifier delay by a delay margin based on a slew rate of an output current on the LLC secondary side above a current threshold;
- causing a first primary side switch to transition from an off state to an on state;
- delaying a first period of time based on the synchronous rectifier delay; and
- causing a first secondary side switch assembly to transition from an off state to an on state after the first period of time.

12. The method of claim 11, wherein determining comprises applying the output voltage in a polynomial equation based on a trend of expected delay values at corresponding input voltage values.

13. The method of claim 12, wherein the polynomial equation comprises a monomial equation.

14. The method of claim 11 further comprising:
- monitoring a frequency of a compensator output; and
- further adjusting the synchronous rectifier delay by the delay margin based on the frequency being above a frequency threshold.

15. The method of claim 14 further comprising:
- monitoring, on the LLC primary side, an input voltage; and
- adjusting the synchronous rectifier delay based on the input voltage.

16. The method of claim 15, wherein adjusting comprises:
- determining a delay due to the output voltage based on the input voltage;
- determining a delay due to the output current based on the output current;
- adding the delay due to the input voltage to the synchronous rectifier delay; and
- subtracting the delay due to the output current from the synchronous rectifier delay.

17. The method of claim 11 further comprising comparing the output voltage to a nominal voltage.

18. The method of claim 17 further comprising adjusting the synchronous rectifier delay based on a default delay if the output voltage is above the nominal voltage.

19. The method of claim 11 further comprising:
- causing the first primary side switch to transition from the on state to the off state;
- causing the first secondary side switch assembly to transition from the on state to the off state;
- causing a second primary side switch to transition from an off state to an on state prior to cessation of current flow through the first secondary side switch assembly; and
- causing a second secondary side switch assembly to transition from an off state to an on state after cessation of current flow through the first secondary side switch assembly.

20. The method of claim 19 further comprising calculating an updated synchronous rectifier delay; and
wherein the transition from the off state to the on state of the second secondary side switch assembly occurs after the updated synchronous rectifier delay.

* * * * *